US006477666B1

(12) United States Patent
Sanchez et al.

(10) Patent No.: US 6,477,666 B1
(45) Date of Patent: Nov. 5, 2002

(54) AUTOMATIC FAULT INJECTION INTO A JAVA VIRTUAL MACHINE (JVM)

(75) Inventors: John C. Sanchez, Pflugerville; Jeffrey Phillip Snover, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/444,657

(22) Filed: Nov. 22, 1999

(51) Int. Cl.[7] ................................................. G06F 9/45
(52) U.S. Cl. ........................... 714/41; 714/38; 714/129
(58) Field of Search ............................. 714/32, 33, 35, 714/38, 41; 717/127, 129

(56) References Cited

U.S. PATENT DOCUMENTS

| | | | | |
|---|---|---|---|---|
| 5,535,329 A | * | 7/1996 | Hastings | 714/35 |
| 5,671,352 A | * | 9/1997 | Subrahmaniam et al. | 714/33 |
| 5,761,513 A | * | 6/1998 | Yellin et al. | 717/127 |
| 5,845,125 A | * | 12/1998 | Nishimura et al. | 717/108 |
| 6,240,545 B1 | * | 5/2001 | Carmichael et al. | 717/116 |
| 6,339,832 B1 | * | 1/2002 | Bowman-Amuah | 710/266 |

OTHER PUBLICATIONS

Bieman et al., "Using Fault Injection to Increase Software Test Coverage", Software Reliability Engineering, 1996. Proceedings Seventh International Symposium on , 1996 pp. 166–174.*

Guthoff et al., "Combing Software–Implemented and Simulation–based Fault Injection into a Single Fault Injection Method", Fau Tolerant Computing, 1995. FTCS–25. Digest of Papers., Twenty–Fifth International Symposium on , 1995, pp. 196–206.*

Arlat et al. "Fault Injection for Dependability Validation: A Methodology and some Applications", Software Engineering, IEEE Transactions on , vol. 16 Issue: 2 , Feb. 1990 pp. 166–182.*

Sinha et al., "Criteria for Testing Exception–Handling Constructs in Java Programs", Software Maintenance, 1999. (ICSM '99) Proceedings. IEEE International Conference on, 1999 pp. 265–274.*

* cited by examiner

*Primary Examiner*—Robert Beausoleil
*Assistant Examiner*—Gabriel L. Chu
(74) *Attorney, Agent, or Firm*—Leslie A. Van Leeuwen; Bracewell & Patterson, L.L.P.

(57) ABSTRACT

A system and method of automatically injecting faults and errors into a JAVA application or program to test the reliable and proper handling of various faults and exceptions under various conditions. An automatic fault injector is coupled to the Java Virtual Machine (JVM). The JAVA program is initiated to inject the faults by determining locations within the JAVA program to where respective faults are to be injected. All the faults are found from the JAVA objects by traversing the class for each of the JAVA objects and searching for all exceptions from the classes, their methods, and their respective attributes. Determination is made of whether and when one of the respective faults should be injected. An exception is automatically and timely triggered to inject a respective fault by the automatic fault injector at a corresponding locations when the corresponding location has been reached and when it has determined that the respective fault should be injected at an appropriate time. The determination of whether and when a fault or error is to be automatically injected is based on the setting of an automatic fault injection option.

21 Claims, 6 Drawing Sheets

AUTOMATIC FAULT INJECTION INTO A JAVA VIRTUAL MACHINE (JVM)

BACKGROUND OF THE INVENTION

1. Technical Field

The present invention relates in general to fault injection into a computer system, and, in particular, to automatic fault injection into a JAVA Virtual Machine.

2. Description of the Related Art

JAVA programming and applications and the JAVA language are well known in the art. With reference now to the figures and in particular with reference to FIG. 1, a prior art example block diagram 2 illustrating a general topology for processing and interpreting a JAVA program or application is shown. The JAVA program or application is in the form of a JAVA source code at block 4. The JAVA source code is compiled into JAVA byte code at block 6. The user computer 10 has within it a JAVA virtual machine (JVM) 12 to receive the JAVA byte code and interpret it for use by the user computer 10. A debugging computer 10 is able to access the JAVA byte code for debugging the JAVA program and application or JAVA code at that stage.

Figure 2:
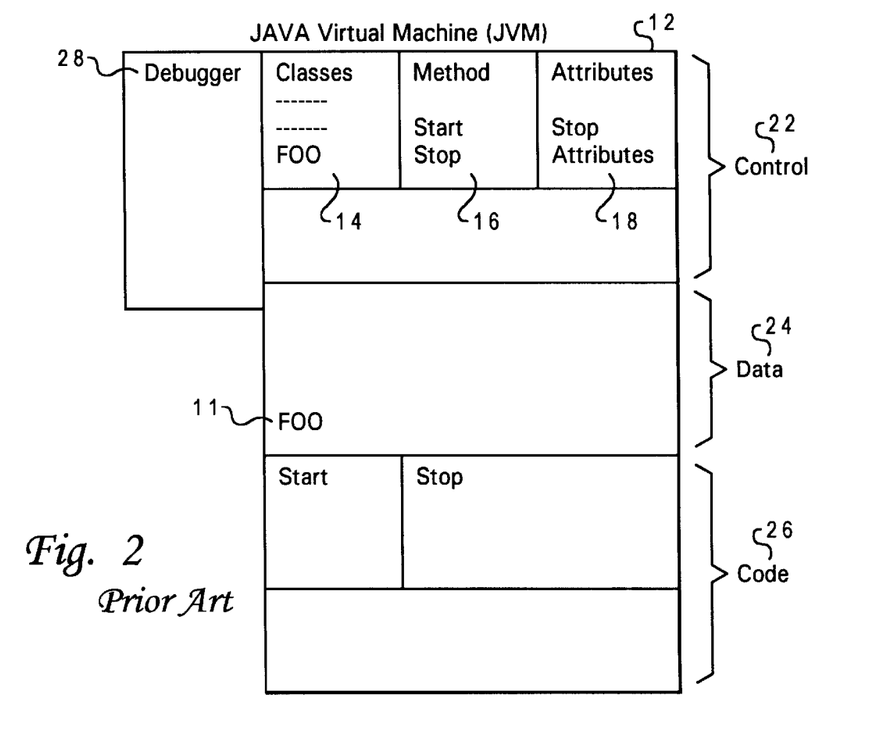
FIG. 2 is a prior art block diagram of an example JAVA virtual machine (JVM)

JVMs are well known in the art. With reference now to the figures and in particular with reference to FIG. 2, a prior art block diagram of an example JVM 12 is shown. The JVM 12 is shown to have a control section 22, a data section 24, and a code section 26. The control section 22 handles and processes JAVA objects. JAVA objects each have a specified class which call upon a method and respective attributes. Thus, the control section 22 comprises a classes sub-section 14, a methods sub-section 16, and an attributes sub-section 18. The data section 24 holds data for the JVM 12, and the code section 26 provides the code for the various methods and attributes of JAVA objects. For example, FIG. 2 shows that the JAVA object 20 is defined by the class "FOO" wherein "FOO" is described within the classes section 14. "FOO" has methods "start" or "stop" in the methods section 16. The attributes of the stop method are accessed in the attributes section 18. The stop attributes describe the method and would typically include location information as well as exceptions or faults, such as "fail", "retry", or "abort" that the method could have when executing.

FIG. 2 further shows that the JVM 12 also has a debugger 28 that debugs the JAVA program or application being handled and processed by the JVM 12. Breakpoints are inserted into the JAVA code at appropriate or desired places where debugging is to be performed, and the debugger 28 is called upon to execute a respective debugging algorithm to debug the code wherever these various breakpoints exist. These debuggers 28 and breakpoints for JVMs 12 are well known in the art.

Presently, injection of faults into software systems has been done to test reliability and obtain results by simulating various fault or error conditions so that the code is verified to handle the fault or error properly. Fault injection generally involves the manual input of codes and/or commands for simulating the various fault and error conditions under various conditions. The fault injection is typically done by injecting the code with failure situations or faults. In a JAVA program or the faults or errors are manually injected via the JAVA source code through conditional execution (i.e. if fault should occur in this condition, then throw an exception (throw the fault)). The problem with this manner of fault injection is that it is manually performed. All possible faults and errors must be manually searched for and found, and a code for injecting each fault and error under all conditions must be created, inserted, and respectively executed. Thus, the manual creation and insertion of the code for faults and errors is extremely tedious, laborious, and/or difficult. Also, the maintenance of this injected code is also very difficult, laborious, and tedious since various conditions for exceptions (i.e. faults) may change or vary. Since manual fault injection is a very laborious and tedious tasks, many users of the JAVA application or program will skip these tests of the JAVA application or program. Thus, reliability and proper handling of faults or exceptions under various conditions by the JAVA program or application would not be tested or verified.

It would therefore be advantageous and desirable to provide an easy way of injecting faults and errors into a JAVA application or program to test the handling of various faults and exceptions under various conditions. It would also be advantageous and desirable to provide an easy way of maintaining the faults and errors injected into the JAVA application or program that test the handling of the faults and exceptions under various conditions. It would further be advantageous and desirable to provide an automatic fault injection system and method into a computer application or program, particularly into a JAVA application or program, wherein the automatic fault injection is configured to test the reliable and proper handling of various faults and exceptions under various conditions.

SUMMARY OF THE INVENTION

It is therefore one object of the present invention to an easy way of injecting faults and errors into a JAVA application or program to test the handling of various faults and exceptions under various conditions.

It is another object of the present invention to provide an easy way of maintaining the faults and errors injected into the JAVA application or program that test the handling of the faults and exceptions under various conditions.

It is a further object of the present invention to provide an automatic fault injection system and method into a computer application or program, particularly into a JAVA application or program, wherein the automatic fault injection is configured to test the reliable and proper handling of various faults and exceptions under various conditions.

The foregoing objects are achieved as is now described. A system and method of automatically injecting faults and errors into a JAVA application or program to test the reliable and proper handling of various faults and exceptions under various conditions. An automatic fault injector is coupled to the Java Virtual Machine (JVM). The JAVA program is initiated to inject the faults by determining locations within the JAVA program to where respective faults are to be injected. All the faults are found from the JAVA objects by traversing the class for each of the JAVA objects and searching for all exceptions from the classes, their methods, and their respective attributes. Determination is made of whether and when one of the respective faults be injected. An exception is automatically and timely triggered to inject a respective fault by the automatic fault injector at a corresponding locations when the corresponding location has been reached and when it has determined that the respective fault should be injected at an appropriate time. The determination of whether and when a fault or error is to be automatically injected is based on the setting of an automatic fault injection option.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF ILLUSTRATIVE EMBODIMENT

The present invention provides an easy way of injecting faults and errors into a JAVA application or program to test the handling of various faults and exceptions under various conditions. The present invention also provides an easy way of maintaining the faults and errors injected into the JAVA application or program that test the handling of the faults and exceptions under various conditions. The present invention further provides an automatic fault injection system and method into a computer application or program, particularly into a JAVA application or program, wherein the automatic fault injection is configured to test the reliable and proper handling of various faults and exceptions under various conditions.

Figure 1:
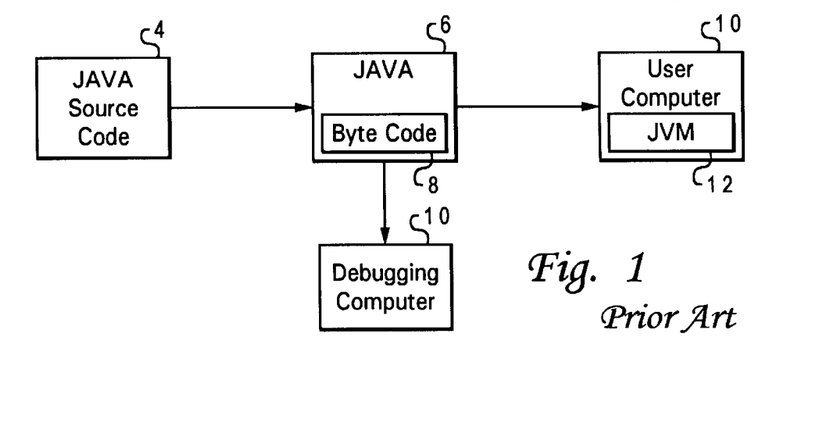
FIG. 1 is a prior art example block diagram illustrating a general topology for processing and interpreting a JAVA program or application.
Figure 3:
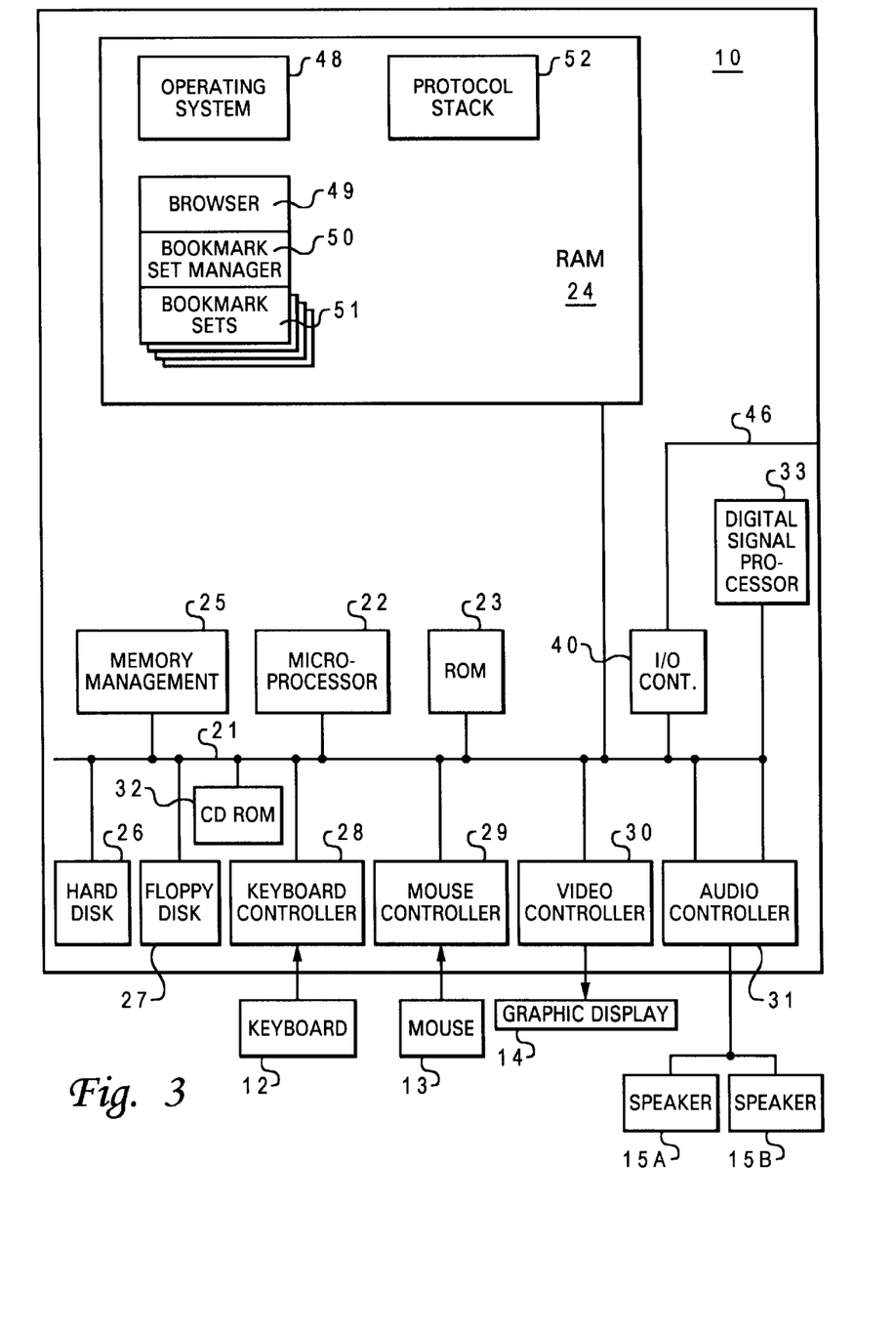
FIG. 3 is an overall block diagram of the computer hardware system, that may be a user computer or a debugging computer as shown in FIG. 1, used in the present invention system and method for providing automatic fault injection into a JAVA virtual machine (JVM)

With reference now to the figures and in particular with reference to FIG. 3, an overall block diagram of the computer hardware system 10, that may be a user computer 10 or debugging computer 10 as shown in FIG. 1, used in the present invention system and method for providing automatic fault injection into a JAVA virtual machine (JVM) 12 is shown. The hardware system 10 is generally a computer system, and the computer system may be able to access a network, Internet, or World Wide Web. The hardware system 10 has a number of computer subsystems in communications with or to each other on a communications bus 21. The various computer sub-systems coupled to the bus 21 include but are not limited to the following systems or devices: a memory management system 25, a microprocessor 22, a read only memory (ROM) system 23, a random access memory (RAM) system 24, an input/output controller (I/O CONT.) 40, a digital signal processor 33, a hard disk 26, a floppy disk 27, a CD ROM a keyboard controller 28, a mouse controller 29, a video controller 30, and an audio controller 31. The I/O CONT. 40 provides communications to an input/output device via line 46. A keyboard 12 is coupled to the keyboard controller 28. A mouse 13 is coupled to the mouse controller 29. A graphic display 14 is coupled to the video controller 30. Speakers 15A and 15B are coupled to the audio controller 31. The RAM system 24 is divided into at least the following memory allocations: 1) operating system 48; 2) protocol stack 52; 3) a browser or web browser 49; 4) a bookmark set manager 50; and 5) bookmark sets 51. The present invention is not in any way limited to the specific hardware disclosed above for the system 10, and any suitable system, sub-system, and/or device may be used to implement the present invention or in conjunction with the present invention.

Figure 4:
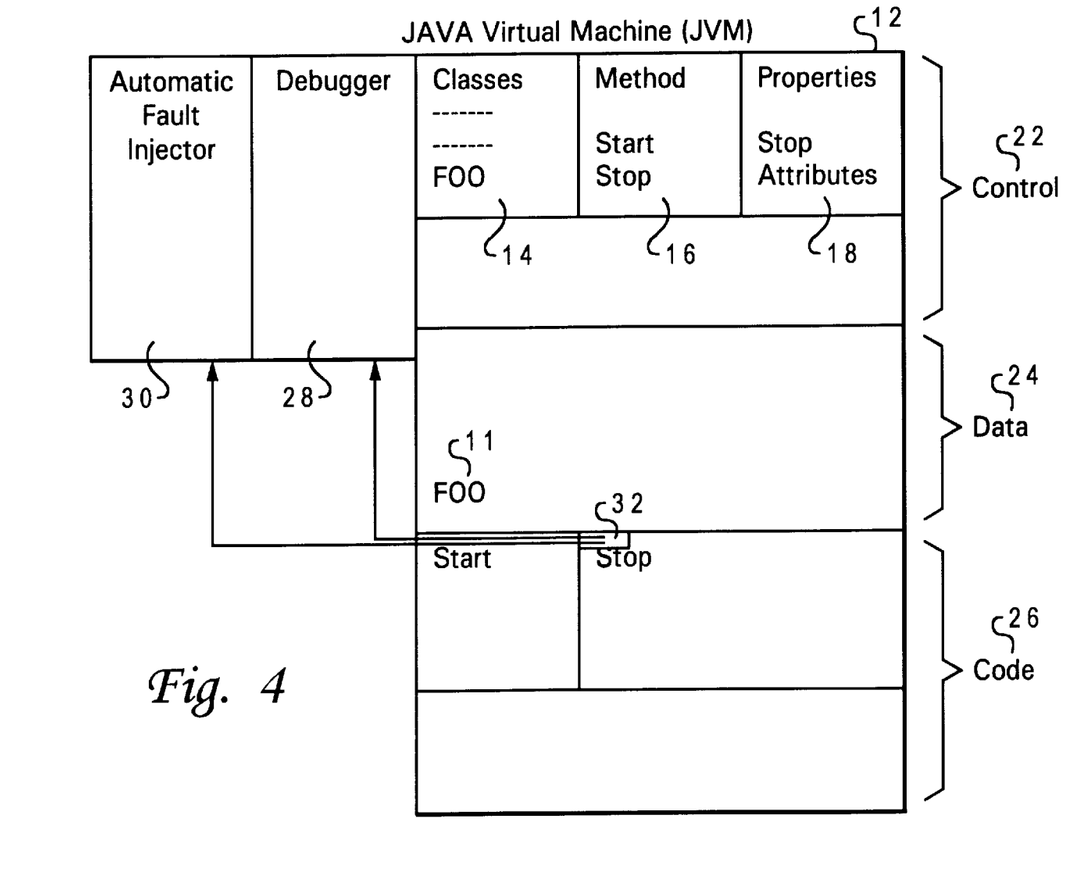
FIG. 4 is a block diagram of a JVM with the present invention automatic fault injector.

With reference now to the figures and in particular with reference to FIG. 4, a block diagram 12 of a JVM 12 with the present invention automatic fault injector 30, which automatically injects faults or errors therein, is shown. The JVM 12 in FIG. 4 is the same JVM 12 in FIG. 2 except that the JVM 12 shows the additional automatic fault injector 30. As stated earlier, the JVM 12 is shown to have a control section 22, a data section 24, and a code section 26. The control section 22 handles and processes JAVA objects 11 (i.e. see FIG. 6). JAVA objects 11 each have a specified class which has a method which has a set of respective attributes. Thus, the control section 22 comprises a classes subsection 14, a methods sub-section 16, and an attributes sub-section 18. The data section 24 holds data for the JVM 12, and the code section 26 provides the code for the various methods for the JAVA objects 11. For example, FIG. 2 shows that the JAVA object 11 is defined by the class "FOO" 14 wherein "FOO" is accessed within the classes section 14. "FOO" calls one of the methods "start" or "stop" described in the methods section 16. The "stop" method has attributes that are articulated in the attributes section 18. The stop attributes would typically include the program location that contains the method as well as exceptions or faults, such as "fail", "retry", or "abort".

FIG. 4 further shows that the JVM 12 also has a debugger 28 that debugs the JAVA program or application being handled and processed by the JVM 12. Breakpoints, such as breakpoints 32, are inserted into the JAVA code at appropriate or desired places where debugging is to be performed, and the debugger 28 is called upon to execute a respective debugging algorithm to debug the code wherever these various breakpoints 32 are encountered when running the program or application. These debuggers 28 and breakpoints 32 for JVMs 12 are well known in the art. Similarly, the automatic fault injection feature of the present invention is set up in the similar manner by setting up breakpoints 32 at appropriate places within the JAVA byte code being processed and interpreted by the JVM 12 wherein the breakpoints 32 indicate where faults or errors are to be respectively injected. When a breakpoint 32 is encountered within the JAVA byte code, then the automatic fault injector 30 is called upon to inject an appropriate or respective fault or error by throwing a corresponding exception.

Figure 5:
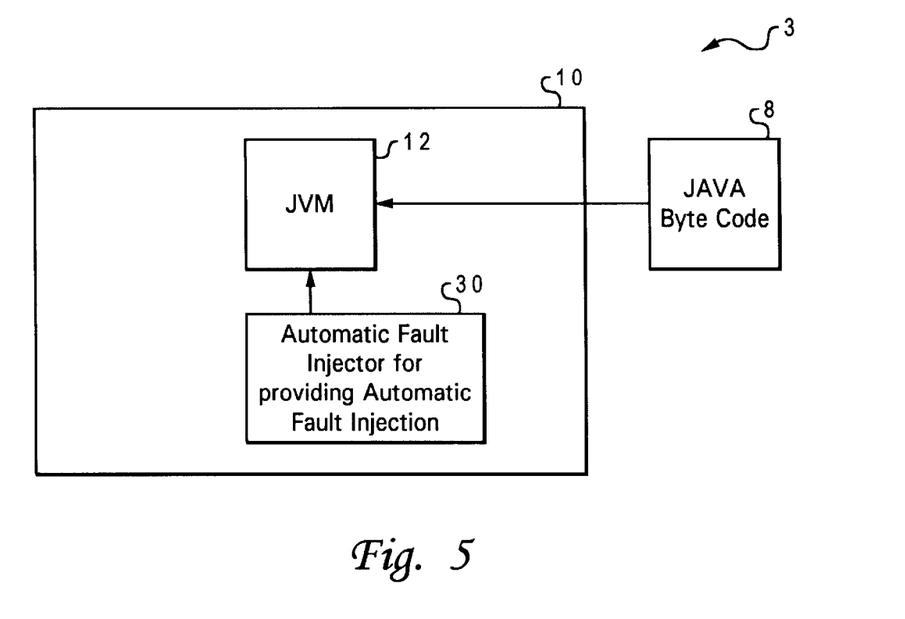
FIG. 5 is a block diagram of the present invention automatic fault injector that provides automatic fault injection wherein the automatic fault injector is encompassed in a computer system and injects faults or errors into a JVM that is interpreting JAVA byte code.

With reference now to the figures and in particular with reference to FIG. 5, a block diagram 3 of the present invention automatic fault injector 30 that provides automatic fault injection wherein the automatic fault injector 30 is encompassed in a computer system 10 injects faults or errors (i.e. throws exceptions) into a JVM 12 that is interpreting JAVA byte code from a block 8.

Referring back to FIG. 4, a breakpoint 32 is inserted in the code for the Stop method of a JAVA Object 11 in the FOO class. The JAVA object 11 in the class FOO is being processed and interpreted by the JVM 12 in FIG. 4. With reference now to the figures and in particular with reference to FIG. 6, a diagram 5 shows the breakdown of the JAVA object 11 in the FOO class. The JAVA object 11 calls methods as it is processed and interpreted by the JVM 12. These methods have attributes which describe the method, and examples of such attributes are location and also any exceptions (or faults) that are able to be thrown for the method.

Figure 6:
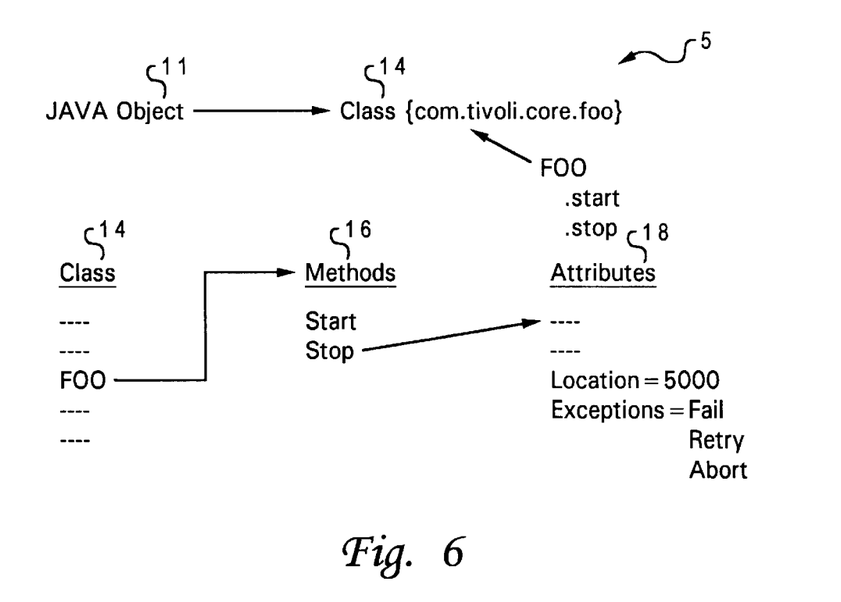
FIG. 6 is a diagram showing the breakdown of a JAVA object in a class which is able to call methods and respective attributes wherein the attributes may comprise various exceptions (or faults) that are able to be thrown.

Referring to FIGS. 4 and 6, the JAVA object 11 in the FOO class 14 is discussed as an example in more detail. FIG. 6 shows that the JAVA object 11 is defined in the "FOO" class 14. In FIG. 6, "FOO" is defined to have two methods 16, "Start" and "Stop". In the example, the Stop method 16 is called. Referring to FIG. 4, when the Stop method is called, a breakpoint 32, that was inserted and set for an automatic fault injection, is reached. The breakpoint 32 causes another piece of code, such as an Event Hook, to be executed. The Event Hook allows the JAVA byte code to continue or allows an exception to be thrown (i.e. fault to be injected). If the latter event occurs, then automatic fault injection is run and executed by the Automatic Fault Injector 30. Referring back to FIG. 6, the Stop method has various attributes 18. These attributes 18 include location information and any exceptions that are able to be thrown. In the present example in FIGS. 4 6, the Stop method is shown to be able throw a "fail", a "retry", or an "abort" exception. The Automatic Fault Injector 30 is configured to determine and/or know which of these exceptions is to be thrown at a respective breakpoint 32 at a breakpoint 32 within the code 26. For example, referring to FIG. 6, a "fail" may be thrown by the automatic fault injector 30 if the breakpoint 32 occurs at one location of the code 26. A "retry" may be thrown by the automatic fault injector 30 if the breakpoint 32 occurs at another location of the code 26 while an "abort" may be thrown by the automatic fault injector if the breakpoint 32 occurs at still another location in the code 26.

When the Event Hook code is executed, then either the JAVA byte code is allowed to continue or the fault is dynamically inserted. If the latter event is to occur, then the automatic fault injection algorithm is executed by the Automatic Fault Injector 30. The code (i.e. Event Hook code) that determines if fault is to be injected and that also inserts the fault is able to be arbitrarily smart, and the code is able to select among a range of options as to how and when the automatic fault injection is to be executed carried out. With reference now to the figures and in particular with reference to FIG. 7, a table 33 of various example automatic fault injection options 34 are shown. These options 34 include the following: Option 36—Always injecting the fault; Option 38—Injecting the fault after X number of calls; Option 40—Injecting the fault if it is the first time that the function or code (i.e. byte code for the program or application) has been called; Option 42—Injecting the fault if the subroutine XX is in the call stack; Option 44—Injecting the fault based upon the value of a variable; and Option 46—Injecting the fault based upon condition of a complex state machine.

Figure 7:
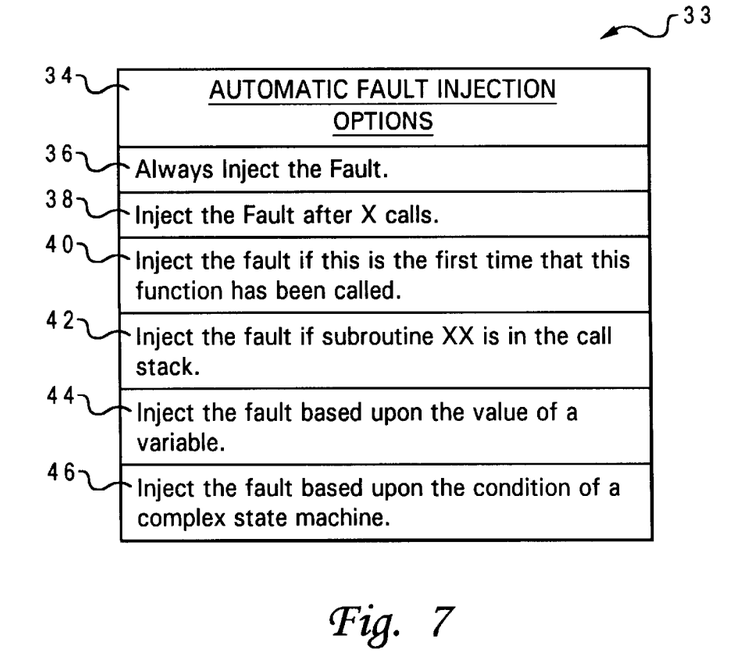
FIG. 7 is a table illustrating various automatic fault injection options for the present invention.

Option 46 where faults are injected based upon conditions of a complex state machine is now discussed in more detail.

Figure 8:
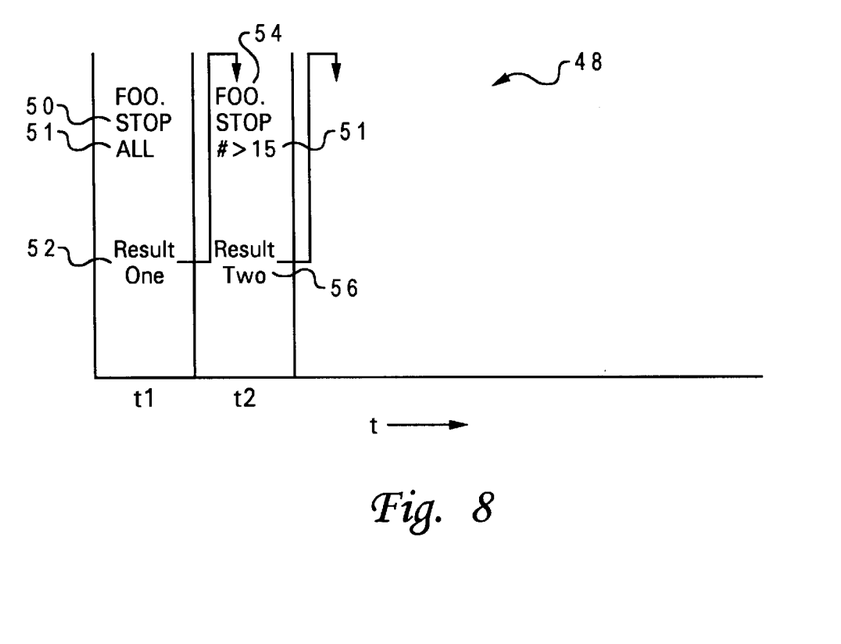
FIG. 8 is a timeline diagram illustrating the execution of faults and throwing of exceptions based upon conditions in a state machine and the providing of respective results.

With reference now to the figures and in particular with reference to FIG. 8, a timeline diagram 48 illustrating the execution of faults and throwing of exceptions based upon conditions in a state machine and the providing of respective results is shown. At time t1, an appropriate exception is always thrown or a fault is always injected when a stop method is executed (i.e. condition of the state machine is "ALL" the time). The throwing of the exception and injecting of the fault produces result one 52. At t2, an appropriate exception is thrown or fault is injected only after 15 calls of the respective byte code (i.e. condition of the state machine is number of calls ("#")>15). The throwing of the exception and injecting of the fault produces result two 56. The timeline diagram 48 continues the injection of faults and throwing of exceptions based on various conditions of the state machine over various times t.

Figure 9:
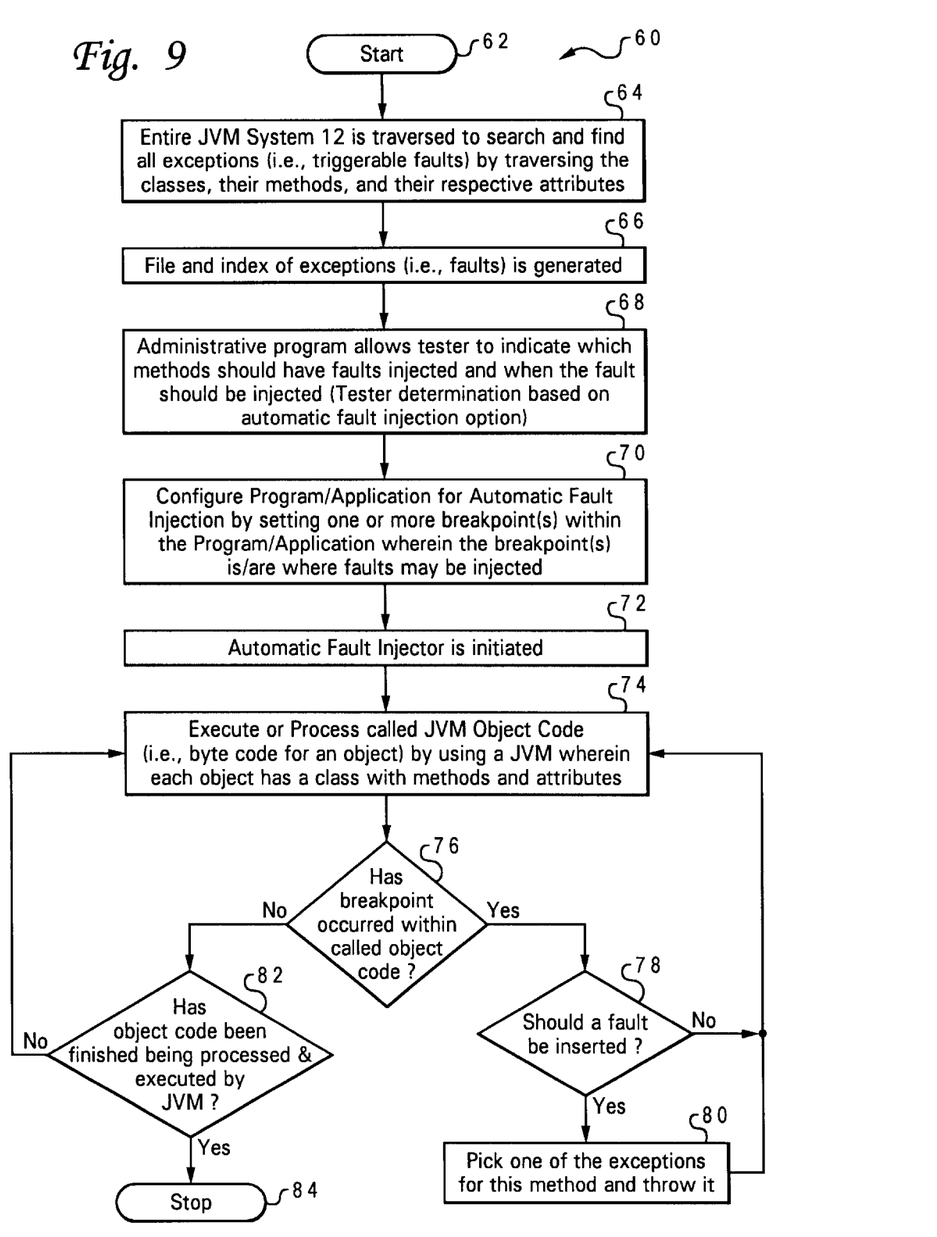
FIG. 9 is an algorithm for providing and executing the present invention automatic fault injection into a JAVA program or application, particularly into a JAVA virtual machine (JVM).

With reference now to the figures and in particular with reference to FIG. 9, an algorithm 60 for providing and executing the present invention automatic fault injection into a JAVA program or application, particularly into a JAVA virtual machine (JVM), is shown. The algorithm 60 starts at block 62 and moves to block 64. At block 64, the algorithm 60 the entire JVM system 12 is traversed to search and find all exceptions (i.e. faults that are able to be triggered) by traversing the classes, their methods, and their respective attributes. The algorithm 60 then moves to block 66 where a file and index of exceptions (i.e. faults) found from all of the classes, their methods, and their respective properties generated. For example, referring back to FIG. 6, the JVM system 12 is traversed by traversing the JAVA object 11 in finding the class 14 of the JAVA object 11. The FOO class 14 refers to and is able to call the methods 16, which are the stop method and start method. The methods 16 are traversed to find the associated attributes 18. The Stop method 16 has as its associated attributes location information and exceptions. The various exceptions (i.e. fail, retry, and abort) are then traversed and found. Each of the exceptions for the JAVA object 11 with the respective referencing and associating information (i.e. exception is associated to the FOO class 14 for its Stop method 16 with possibly any other information relating to the exception, such as when and under which condition(s) it is triggered) is stored in a file and index of exceptions. Exceptions from all classes for all objects 11 are searched, found, stored, and tracked in the file and index of exceptions.

The algorithm 60 moves to block 68. At block 68, an administrative program allows a tester to indicate which methods should have faults injected and when the fault should be injected. This determination by the tester is based on a selected automatic fault injection option, such as one of the options shown in FIG. 7 that were discussed earlier. The algorithm moves to block 68. At block 68, the algorithm 60 configures the JAVA program or application for automatic fault injection by setting one or more respective breakpoint (s) within the JAVA program or application. The breakpoint (s) is/are set where faults may be injected. The algorithm 60 moves to block 72 where the automatic fault injector 30 is initiated. The algorithm 60 then moves to block 74. At block 74, one of the JVM object codes (i.e. byte code for an object) among the various objects is executed and by using a JVM 12. As stated earlier, each of the various objects has a class with methods and respective attributes.

The algorithm 60 then moves to decision block 76 where it is determined whether a breakpoint 32 has occurred within the called object code. If a breakpoint 32 has occurred at decision block 76, then the algorithm 60 moves to decision block 78. At decision block 78, the algorithm 60 determines whether a fault should be inserted (i.e. determination is based on selected automatic fault injection option, such as the ones shown in FIG. 7. If a fault should not be inserted, then the algorithm 60 loops back to block 74 and continues therefrom. However, if a fault should be inserted, then the algorithm 60 moves to block 80. At block 80, the algorithm 60 picks one of the exceptions for this method and throws the selected exception. The algorithm 60 loops back to block 74 and continues therefrom.

On the other hand, if a breakpoint 32 has not occurred at decision block 76, then the algorithm 60 moves directly to decision block 82. At decision block 82, the algorithm 60 determines whether the called object code has been finished being processed and executed by the JVM 12. If the object code has not been finished being processed and executed by the JVM 12 at decision block 82, then the algorithm 60 loops back to block 74 to further continue executing and processing of the object code, and the algorithm 60 continues therefrom. However, if the object code has been finished being processed and executed by the JVM 12 at decision block 82, then the algorithm 60 ends at block 84.

While the invention has been particularly shown and described with reference to a preferred embodiment, it will be understood by those skilled in the art that various changes in form and detail may be made therein without departing from the spirit and scope of the invention.

What is claimed is:

1. A method of automatically injecting faults into a JAVA virtual machine (JVM) when the JVM is executing a JAVA program that has JAVA objects wherein each of the JAVA objects has a class, at least one method, and at least one attribute, comprising the steps of:

initiating the JAVA program to inject the faults by determining locations within the JAVA program to where respective faults are to be injected, finding and maintaining all the faults by traversing the class for each of the JAVA objects and searching for all exceptions from the class, the at least one method, and the at least one attribute, determining whether and when one of the respective faults should be injected, and automatically and timely triggering one of the exceptions to inject the one of the respective faults at one of the corresponding locations when the one of the corresponding locations has been reached and when it has determined that the one of the respective faults should be injected at an appropriate time.

2. The method according to claim 1, wherein the initiating step further comprises the step of:

setting at least one breakpoint in the JAVA program wherein the at least one breakpoint is at the locations.

3. The method according to claim 2, wherein the at least one breakpoint is a number of breakpoints.

4. The method according to claim 2, further comprising the steps of:

calling and executing one of the JAVA objects by using the JVM, determining whether one of the at least one breakpoint has occurred within the called one of the JAVA objects, determining whether one of the faults should be inserted if the one of the at least one breakpoint has occurred, selecting and throwing one of the exceptions for the at least one method and continuing execution of the called one of the JAVA objects if the one of the faults should be inserted, continuing execution of the called one of the JAVA objects if the one of the faults should not be inserted, determining whether the called one of the JAVA objects has finished being processed and executed by the JVM if the one of the at least one breakpoint has not occurred, continuing execution of the called one of the JAVA objects if the one of the JAVA objects has not finished being processed and executed by the JVM, and terminating the method if the called one of the JAVA objects has finished being processed and executed by the JVM.

5. The method according to claim 1, wherein the initiating step further comprises the steps of:

coupling an automatic fault injector to the JVM, and initiating and using the automatic fault injector for injecting the faults.

6. The method according to claim 1, wherein the finding and maintaining step further comprises the step of:

generating and maintaining a file for storing all exceptions.

7. The method according to claim 1, wherein the determining step further comprises the steps of:

determining which of the at least one method should have the respective faults injected based on automatic fault injection options.

8. The method according to claim 7, further comprising the steps of:

setting the automatic fault injection options, and selecting and throwing one of the exceptions for the at least one method based on one of the set automatic fault injection options.

9. The method according to claim 7, wherein the automatic fault injection options further comprises an option for injecting a fault all of the time, an option for injecting a fault after a number of calls of the called one of the JAVA objects, an option for injecting a fault if the one of the JAVA objects has been called for a first time, an option for injecting a fault if a certain subroutine is in a call stack, an option for injecting a fault based upon a variable value, and an option for injecting a fault based upon a condition of a complex state machine.

10. A system of automatically injecting faults into a JAVA virtual machine (JVM) when the JVM is executing a JAVA program that has JAVA objects wherein each of the JAVA objects has a class, at least one method, and at least one attribute, comprising:

an automatic fault injector coupled to the JVM, wherein the JAVA program is interpreted by the JVM and the JAVA program is initiated to inject the faults by determining locations within the JAVA program to where respective faults are to be injected, wherein all the faults are found from the JAVA objects by traversing the class for each of the JAVA objects and searching for all exceptions from the class, the at least one method, and the at least one attribute, wherein determination of whether and when one of the respective faults should be injected are made, and wherein one of the exceptions is automatically and timely triggered to inject one of the respective faults by the automatic fault injector at one of the corresponding locations when the one of the corresponding locations has been reached and when it has determined that the one of the respective faults should be injected at an appropriate time.

11. The system according to claim 10, wherein at least one breakpoint is set in the JAVA program wherein the at least one breakpoint is at the locations within the JAVA program to where the respective faults are to be injected.

12. The system according to claim 11, wherein the at least one breakpoint is a number of breakpoints.

13. The system according to claim 10, wherein the automatic fault injector is initiated and used for injecting the faults.

14. The system according to claim 10, wherein a file is generated and maintained for storing all exceptions.

15. The system according to claim 10, wherein a determination of which of the at least one method should have the respective faults injected based on automatic fault injection options is made.

16. The system according to claim 15, wherein:

the automatic fault injection options are set and one of the exceptions is selected and thrown for the at least one method based on one of the set automatic fault injection options.

17. The system according to claim 15, wherein the automatic fault injection options further comprises an option for injecting a fault all of the time, an option for injecting a fault after a number of calls of the called one of the JAVA objects, an option for injecting a fault if the one of the JAVA objects has been called for a first time, an option for injecting a fault if a certain subroutine is in a call stack, an option for injecting a fault based upon a variable value, and an option for injecting a fault based upon a condition of a complex state machine.

18. The system according to claim 10, wherein:

one of the JAVA objects is called and executed by using the JVM, one of the at least one breakpoint is determined to have occurred within the called one of the JAVA objects, a determination is made as to whether one of the faults should be inserted if the one of the at least one breakpoint has occurred, one of the exceptions is selected and thrown for the at least one method and execution of the called one of the JAVA objects is continued if the one of the faults should be inserted, execution of the called one of the JAVA objects is continued if the one of the faults should not be inserted, a determination is made as to whether the called one of the JAVA objects has finished being processed and executed by the JVM if the one of the at least one breakpoint has not occurred, execution of the called one of the JAVA objects is continued if the one of the JAVA objects has not finished being processed and executed by the JVM, and the execution of the called one of the JAVA objects is terminated if the called one of the JAVA objects has finished being processed and executed by the JVM.

19. A program product for automatically injecting faults into a JAVA virtual machine (JVM) when the JVM is executing a JAVA program that has JAVA objects wherein each of the JAVA objects has a class, at least one method, and at least one attribute, comprising:

instruction means for initiating the JAVA program to inject the faults by determining locations within the JAVA program to where respective faults are to be injected, instruction means for finding and maintaining all the faults by traversing the class for each of the JAVA objects and searching for all exceptions from the class, the at least one method, and the at least one attribute, instruction means for determining whether and when one of the respective faults should be injected, instruction means for automatically and timely triggering one of the exceptions to inject the one of the respective faults at one of the corresponding locations when the one of the corresponding locations has been reached and when it has determined that the one of the respective faults should be injected at an appropriate time, and computer usable media bearing said instruction means.

20. The program product according to claim 19, wherein said computer usable media is a memory media.

21. The program product according to claim 19, wherein said computer usable media bearing is a floppy disk.

* * * * *